(No Model.) 3 Sheets—Sheet 1.
M. L. CLINTON.
STEAM BOILER.
No. 372,519. Patented Nov. 1, 1887.
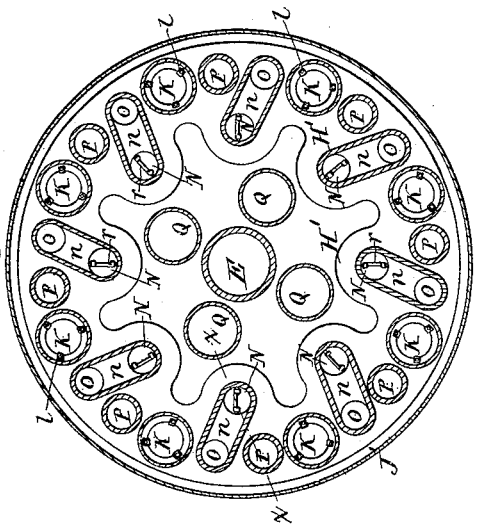
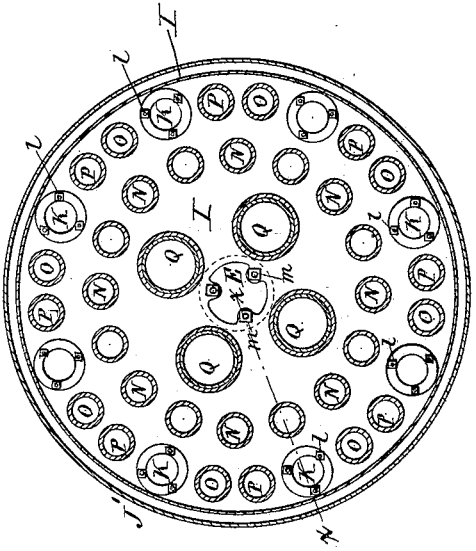
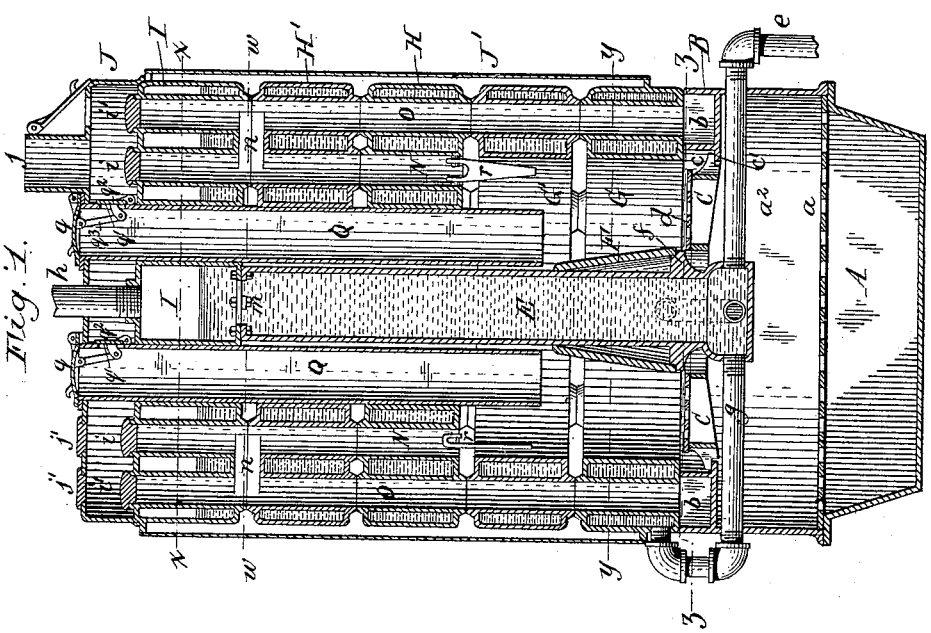
Witnesses: Geo. J. Buchheit Jr., Theo. L. Popp
M. L. Clinton, Inventor.
By Wilhelm & Bonner, Attorneys.

(No Model.) 3 Sheets—Sheet 2.
M. L. CLINTON.
STEAM BOILER.

No. 372,519. Patented Nov. 1, 1887.

Witnesses: Geo. J. Buchheit Jr., Theo. L. Popp.

M. L. Clinton, Inventor.
By Wilhelm & Bonner,
Attorneys.

(No Model.) 3 Sheets—Sheet 3.
M. L. CLINTON.
STEAM BOILER.

No. 372,519. Patented Nov. 1, 1887.

Witnesses:
Geo. J. Buchheit Jr
Theo. L. Popp

M. L. Clinton
Inventor.
By Wilhelm Bonner
Attorneys.

UNITED STATES PATENT OFFICE.

MILES L. CLINTON, OF ITHACA, NEW YORK, ASSIGNOR TO SARAH C. CLINTON, OF SAME PLACE.

STEAM-BOILER.

SPECIFICATION forming part of Letters Patent No. 372,519, dated November 1, 1887.

Application filed May 25, 1887. Serial No. 239,356. (No model.)

*To all whom it may concern:*

Be it known that I, MILES L. CLINTON, of Ithaca, in the county of Tompkins and State of New York, have invented a new and useful Improvement in Steam-Boilers, of which the following is a specification.

This invention relates to an improvement in that class of steam-boilers which are composed of superposed or horizontal sections, and has for its object to produce a steam-boiler of this kind which is simple in construction, easily put together and operated, and which is economical in the consumption of fuel.

My invention consists of the improvements which will be hereinafter fully set forth, and pointed out in the claims.

Figure 6:
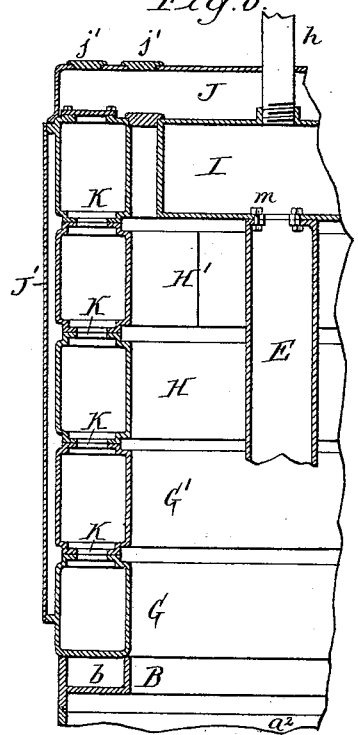
Figure 7:
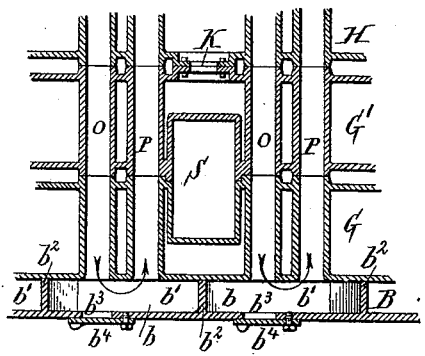
Figure 8:
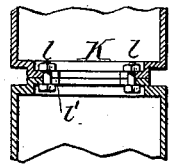
Figure 9:
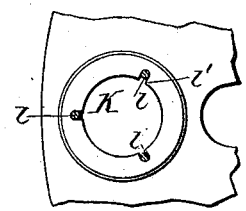
Figure 10:
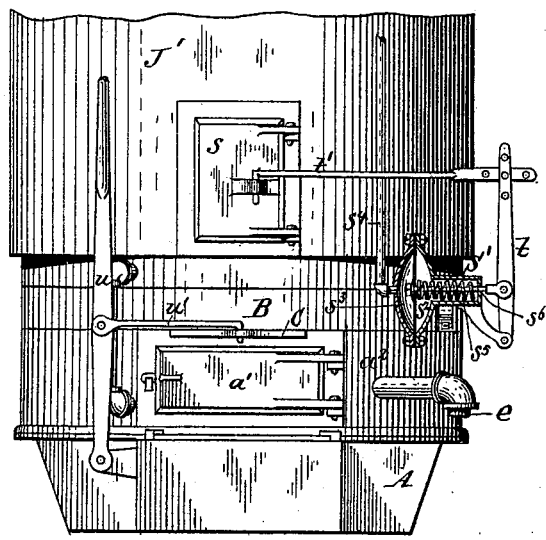
Figure 11:
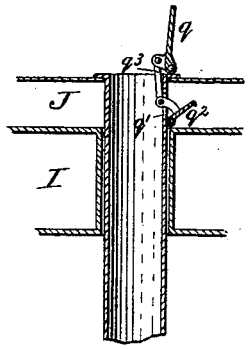
Figure 12:
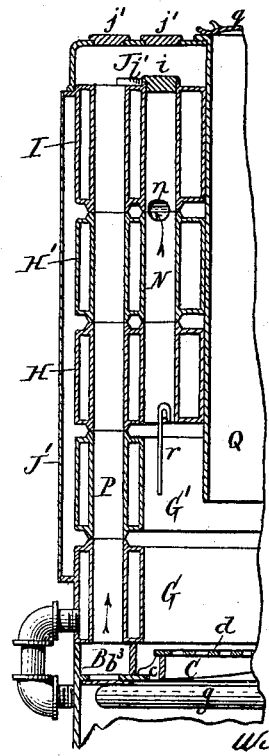

In the accompanying drawings, consisting of three sheets, Figure 1 is a vertical section of my improved steam-boiler. Figs. 2, 3, 4, and 5 are horizontal sections in lines $w\,w$, $x\,x$, $y\,y$, and $z\,z$, Fig. 1, respectively. Fig. 6 is a fragmentary vertical section in line $x\,x$, Fig. 3, on an enlarged scale. Fig. 7 is a fragmentary vertical section in line $x\,x$, Fig. 4, on an enlarged scale. Fig. 8 is a vertical section of one of the water-connections. Fig. 9 is a top plan view thereof. Fig. 10 is a front elevation, partly in section, of the lower part of the boiler. Fig. 11 is a vertical section of the upper portion of one of the fuel-magazines. Fig. 12 is a vertical section in line $x\,x$, Fig. 2.

Like letters of reference refer to like parts in the several figures.

A represents the base of the boiler, which may be embedded into the floor of the cellar of the building, my improved boiler being especially designed for warming buildings.

$a$ is a cinder-grate which rests upon the base A, and through which the fine ashes pass into the base A, while the cinders remain on the grate $a$ and are removed through the door $a'$, arranged in the front of the ash-pit $a^2$.

B represents a base-ring or annular frame, which rests upon the ash-pit $a^2$. This ring is provided at its upper side with an annular depression, $b$, which is divided into compartments $b'$ by radial partitions $b^2$. Each compartment is provided in the bottom of the ring with an opening, $b^3$, which can be closed by a gate, $b^4$, pivoted to the lower side of the ring B.

C represents an annular grate-frame arranged within the ring B and provided at its circumference with lugs $c$, which rest upon segmental flanges $c'$, formed on the inner side of the ring B, so that the grate-frame can be swung back and forth in shaking it. The latter is composed of removable sections $d$, resting upon the frame C.

E represents a water-column arranged in the center of the boiler and receiving the feed-water at its lower end from a pipe, $e$. The grate-frame C surrounds the lower portion of the water-column, and the latter is provided above the grate with a horizontal flange, $f$, upon which is supported a metallic tubular protector, F, which surrounds the water-column within the fire-chamber and prevents the fuel from becoming chilled by contact with the water-column. This protector becomes red-hot and transmits the heat to all parts of the surrounding fuel, thereby maintaining a uniform fire in all parts of the fire-chamber.

G G' represent two superposed horizontal sections of the boiler which inclose the fire-chamber. The section G rests upon the base-ring B and the section G' rests upon the section G.

H represents a section which rests upon the section G', and H' represents a section which rests upon the section H.

I represents the dome, which rests upon the top section, H'.

J represents the smoke box resting upon the dome I, and J' represents a jacket or casing inclosing the sections.

$g$ represents water-pipes which connect the lower portion of the water-column E with the lower section, G, and conduct the water to the same.

$h$ represents the steam pipe through which the steam is taken from the dome I.

K represents water-passages formed, respectively, in the upper and lower sides of the sections, the passages in one section registering with those of the adjacent section, so that these passages establish communications between the sections, as represented in Fig. 6. The two adjacent sections are secured together by screw-bolts $l$, which are arranged within the water-passages, the flanges of the latter being constructed in their inner edges with notches $l'$, in which the bolts are arranged. In securing two sections together the bolts are tightened by inserting a socket-wrench through the water-passage in the top of the section. The bolts being arranged in the water space, all parts of the joint are subjected to the same temperature, and leakage, by unequal expansion or contraction of the part, is avoided. The upper end of the water-column E is secured to the dome I by bolts $m$, arranged in the same manner in slots formed in the adjacent flanges of the water-column and dome.

N represents ascending flues formed in the sections H H' above the grate, and connecting at their upper ends with short horizontal passages $n$, formed partly in the upper section, H', and partly in the dome I. Each passage $n$ communicates with a descending flue, O, which extends through the sections H' H and through the lower sections, G' G, and opens into one of the compartments of the base ring B, between the partitions $b^2$ thereof.

Figure 4:
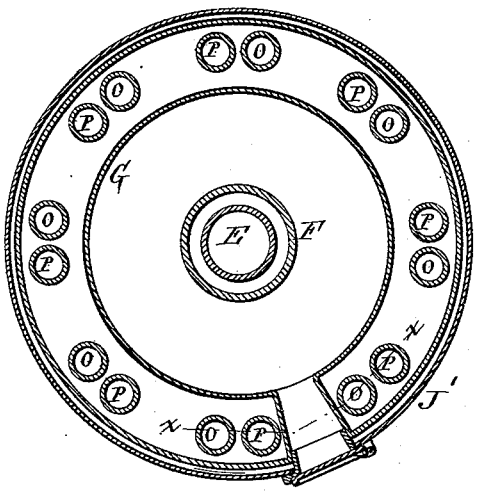
Figure 5:
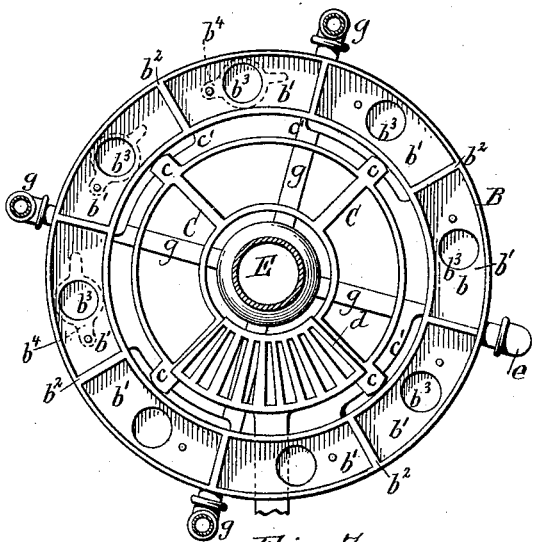

P represents an ascending flue which extends through all the sections from the base-ring B to the smoke-box J. The ascending flues N and descending flues O extend to the top of the dome I, but have their upper ends closed by plugs $i$ $i'$, while the upper ends of the ascending flues P are open, so that the flame and hot gases pass from the fire-chamber upwardly through the ascending flues N, thence outwardly through the horizontal passages $n$, thence downwardly through the descending flues O, thence through the compartments of the base-ring B, thence upwardly through the ascending flues P into the smoke-chamber J and smoke-pipe $j$. Each compartment $b'$ of the base-ring B connects a descending flue, O, with an ascending flue, P. The inner walls of the lower sections, G G', are circular, as represented in Fig. 4, while those of the upper sections, H H', are indented, as represented in Fig. 2, to increase the heating-surface and reduce the thickness of the water-bodies in the sections. The top of the smoke-box J is provided with openings which are arranged in line with the flues and closed by plugs $j'$. Upon removing these plugs and those of the flues and opening the gates $b^4$ in the base-ring the flues can be cleaned out and the ashes be discharged into the ash-pit.

Q represents fuel-magazines arranged around the central water-column and suspended from the top of the smoke-box.

$q$ represents hinged covers which close the upper ends of the magazines.

$q'$ represents gas-escape openings formed in the sides of the magazines in the smoke-box, and $q^2$ represents hinged valves arranged to open and close the openings $q'$.

$q^3$ represents rods connecting the covers $q$ with the valves $q^2$. Upon opening a cover, $q$, the valve $q^2$ is opened also, as represented in Fig. 10, thereby causing the gas in the magazines to be drawn by the draft into the smoke-box, and thence into the smoke-pipe. Upon closing the cover $q$, the damper $q^2$ is closed also, as represented in Fig. 1.

$r$ represents plates of metal supported on lugs at the lower ends of the ascending flues N and depending into the fire-chamber. These plates become red-hot and ignite the gases which enter the flues.

S represents a passage formed in the sides of the sections G G', and $s$ is the fire-door applied to said passage.

S' represents an automatic regulator, of well-known construction, provided with a flexible diaphragm, $s^2$, a chamber, $s^3$, receiving steam through a pipe, $s^4$, from the dome I, and a spring, $s^5$, surrounding a stem, $s^6$. The latter is connected by a lever, $t$, and rod $t'$ with the fire-door $s$. When the steam-pressure rises above the normal pressure, the fire-door is automatically opened, thereby checking the draft, and when the steam-pressure falls below the normal the fire-door is closed.

$u$ represents an upright hand-lever pivoted at its lower end to the base A, and connected with the grate-frame C by a rod, $u'$, so that the grate can be conveniently shaken.

The central water-column increases the steam-generating capacity of the boiler materially.

My improved boiler is easily constructed of cast-iron and readily put together. It is also easily operated and kept in order.

I claim as my invention—

1. The combination, with the horizontal boiler-sections provided with ascending flues N, descending flues O, and ascending flues P, of a base-ring, B, provided with compartments $b'$, connecting the lower ends of the flues O and P, substantially as set forth.

2. The combination, with the horizontal boiler-sections G G' H H' and dome I, of the central water-column, E, communicating with the water and steam spaces of the boiler, substantially as set forth.

3. The combination, with the horizontal boiler-sections G G' H H' and the dome, of the central water-column, E, communicating at its upper end with the dome, and water-pipes $g$, connecting the lower portion of the water-column E with the boiler-section G, substantially as set forth.

4. The combination, with the horizontal boiler-sections provided with flues N O P, of the base-ring B, provided with compartments $b'$, having openings $b^3$ and movable gates $b^4$, substantially as set forth.

5. The combination, with the boiler-sections and the central water-column, E, of the metallic protector F, surrounding the water-column within the fire-chamber, substantially as set forth.

6. The combination, with the boiler-sections having ascending flues N, of the pendent metallic plates $r$, arranged in the mouths of said flues, substantially as set forth.

7. The combination, with the boiler-sections and the central water-column, E, of the circular grate-frame C, surrounding said column, and the grate-sections $d$, resting on said frame, substantially as set forth.

8. The combination, with the boiler-sections, of the smoke-box J, resting on the same, a fuel-magazine, Q, provided with an opening, $q'$, a cover, $q$, and a valve, $q^2$, connected with the cover $q$, substantially as set forth.

Witness my hand this 7th day of May, 1887.

MILES L. CLINTON.

Witnesses:
J. T. MORRISON,
GEO. S. BARBER.